(12) United States Patent
Kim et al.

(10) Patent No.: US 8,341,758 B2
(45) Date of Patent: Dec. 25, 2012

(54) SECURE DEVICE AND METHOD FOR PREVENTING SIDE CHANNEL ATTACK

(75) Inventors: Ju Han Kim, Daejeon (KR); You Sung Kang, Daejeon (KR); Doo Ho Choi, Cheonan (KR); Yong-Je Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 132 days.

(21) Appl. No.: 12/964,403

(22) Filed: Dec. 9, 2010

(65) Prior Publication Data

US 2011/0145595 A1 Jun. 16, 2011

(30) Foreign Application Priority Data

Dec. 11, 2009 (KR) ........................ 10-2009-0123450

(51) Int. Cl.
*G06F 21/00* (2006.01)
(52) U.S. Cl. .............................. 726/34; 726/25; 713/189
(58) Field of Classification Search ..................... 726/34, 726/25
See application file for complete search history.

(56) References Cited

U.S. PATENT DOCUMENTS

| 6,507,913 | B1 | 1/2003 | Shamir | |
| 6,726,108 | B1 * | 4/2004 | Guion | 235/492 |
| 7,246,375 | B1 * | 7/2007 | Jean et al. | 726/21 |
| 7,599,488 | B2 | 10/2009 | Kocher et al. | |
| 2003/0084336 | A1 * | 5/2003 | Anderson et al. | 713/200 |

FOREIGN PATENT DOCUMENTS

| KR | 10-2010-0062796 A | 6/2010 |
| WO | WO 2009115864 A1 * | 9/2009 |

OTHER PUBLICATIONS

Siva Sai Yerubandi, "Differential Power Analysis", Oregon State University, Oct. 17, 2002.*

* cited by examiner

*Primary Examiner* — Edward Zee
*Assistant Examiner* — Yogesh Paliwal

(57) ABSTRACT

Provided are a secure device and method for preventing a side channel attack. The secure device includes a secure module converting plaintext data received from the outside into ciphertext data to thereby store the converted ciphertext data, or converting stored ciphertext data into plaintext data to thereby output the converted plaintext data, and a side channel attack sensing module sensing a side channel attack upon the secure module, and, according to the sensing result, allowing the secure module to stop operating, inducing malfunctions of the secure module, delaying operations of the secure module, or making the secure module a device having the secure module disabled. The secure device can safely protect an internal security algorithm and data from the side channel attack.

10 Claims, 4 Drawing Sheets

SECURE DEVICE AND METHOD FOR PREVENTING SIDE CHANNEL ATTACK

CROSS-REFERENCE TO RELATED APPLICATIONS

This U.S. non-provisional patent application claims priority under 35 U.S.C. §119 of Korean Patent Application No. 10-2009-0123450, filed on Dec. 11, 2009, the entire contents of which are hereby incorporated by reference.

BACKGROUND OF THE INVENTION

The present invention disclosed herein relates to a secure device and method for preventing side channel attack.

An encryption analysis method of finding out secret information such as an encryption key by measuring power consumed in an operation procedure of encryption algorithm or a time taken for executing an operation, has been developed. A side channel means the leakage of secret information about code algorithm, and a side channel attack means an attack method using a side channel. Such a side channel attack is mainly classified into a timing attack, a fault insertion attack, and a power analysis attack.

SUMMARY OF THE INVENTION

The present invention provides a secure device and a method for preventing a side channel attack.

Embodiments of the present invention provide secure devices including: a secure module converting plaintext data received from the outside into ciphertext data to thereby store the converted ciphertext data, or converting stored ciphertext data into plaintext data to thereby output the converted plaintext data; and a side channel attack sensing module sensing a side channel attack upon the secure module, and, according to the sensing result, allowing the secure module to stop operating, inducing malfunctions of the secure module, delaying operations of the secure module, or making the secure module a device having the secure module disabled.

In some embodiments, the side channel attack sensing module may include: a switch connected between a power supply terminal and a charging node, and operating in response to a command execution enable signal generated whenever a command is executed in the secure module; a capacitor connected between the charging node and a ground, and accumulating charges transferred from the power supply terminal according to an operation of the switch; and a side channel attack sensing unit sensing a voltage between the charging node and the ground, and determining that there is a side channel attack when the sensed voltage exceeds a predetermined value.

In other embodiments, the side channel attack sensing unit may determine that there is no side channel attack when the sensed voltage does not exceeds the predetermined value even after the lapse of a predetermined time.

In still other embodiments, when it is determined that there is no side channel attack, the side channel sensing module may discharge the capacitor by connecting the charging node to the ground.

In even other embodiments, the side channel attack sensing module may comprise a command execution counter increasing execution number of commands whenever the commands are executed in the secure module; and a comparator determining whether the increased execution number of commands exceeds a predetermined value, and determining that there is a side channel attack when the increased execution number of commands exceeds the predetermined value as the determination result.

In yet other embodiments, the side channel attack sensing module may comprise a non-volatile memory for storing the predetermined value.

In further embodiments, the side channel attack module may cut off supplying of power to the secure module by cutting a fuse when sensing the side channel attack.

In still further embodiments, the side channel attack sensing module may make the secure module disabled by changing an execution code of the secure module when sensing the side channel attack.

In even further embodiments, the side channel attack sensing module may comprise a sensor configured to sense abnormal current or voltage, or sense laser light.

In even further embodiments of the present invention provide secure devices including: a secure module converting plaintext data received from the outside into ciphertext data to thereby store the ciphertext data, or converting stored ciphertext data into plaintext data to thereby output the plaintext data; and a command execution counter increasing execution number of commands whenever the secure module operates, and limiting the operation of the secure module when the execution number of commands exceeds a predetermined value.

In yet further embodiments, the predetermined value may be set again according to authentication procedure, after the operation of the secure module is limited.

In other embodiments of the present invention, methods of protecting a side channel attack of a secure device, the method including: sensing a side channel attack; and when sensing the side channel attack, stopping operations of a secure module, inducing malfunctions of the secure module, delaying operations of the secure module, making the secure module or a device having the secure module disabled.

In still other embodiments, the sensing of the side channel attack may include: accumulating charges on the capacitor whenever the commands are executed in the secure device; and sensing the side channel attach by sensing whether a voltage of the capacitor exceeds a predetermined value.

In even other embodiments, the sensing of the side channel attack may include: increasing the execution number of commands when the commands are executed in the secure device; and sensing the side channel attack according to whether the increase execution number of commands exceeds a predetermined value.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Hereinafter, embodiments of the present invention will be described with reference to the accompanying drawings to fully explain the present invention in such a manner that it can easily be carried out by a person with ordinary skill in the art to which the present invention pertains.

Figure 1:
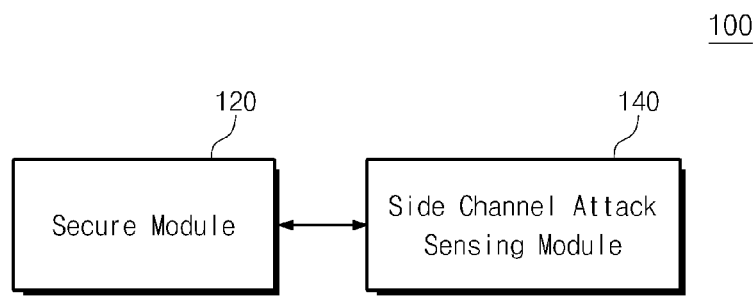
FIG. 1 is a diagram illustrating an embodiment for a secure device according to the present invention.

FIG. 1 is a diagram illustrating an embodiment for a secure device according to the prevent invention. Referring to FIG. 1, the secure device 100 may include a secure module 120 and a side channel attack sensing module 140.

The secure module 120 may encode plaintext data or decode ciphertext data. Although not shown in the drawings, the secure module 120 may include a nonvolatile memory device for storing encoded data, a block encoding chip for decoding encoded data using an encryption key, a volatile memory device for storing the encryption key or the encoded data, etc. The secure device 100 of the present invention may be used for a smart card, a USIM chip, an RFID tag, a wireless sensor note, or the like.

The side channel attack sensing module 140 may sense the side channel attack upon the secure module 120. When sensing the side channel attack, the side channel attack sensing module 140 may stop the operation of the secure module 120, induce a malfunction of secure module 120, delay the operation of the secure module 120, or make the secure module 120 or the device 100 having the secure module 120 disabled.

Here, the side channel attack acquires leakage power signals (for example, electromagnetic wave signals) generated by performing the same encoding operation on the secure module 120 repeatedly, and finds out an encryption key by detecting a minute change according to the acquired leakage power signals.

The side channel attack is mainly classified into a timing attack, a fault insertion attack, a power analysis attack, and the like. For the convenience of description, it is assumed that the side channel attack of the present invention is a differential power analysis (DPA).

The DPA may use technologies of stochastic analysis and error correction in order to extract information having exact correlation with an encryption key from the leakage power signals acquired. The DPA is a powerful attack method more difficult to defense than a simple power analysis (SPA). Particularly, if there are only some apparatuses (for example, an oscilloscope, etc.) capable of observing a voltage change, the DPA may make it possible to assume an encryption key.

A classification function of the DPA may be used for classifying the leakage power signals acquired, and classified into a hamming weight model and a hamming distance model according to consumption power characteristics. The hamming weight model is based on the fact that '1' consumes more power than '0'. The hamming distance model is based on the fact that a data transition affects power dissipation. In a difference method of verifying the encryption key assumed, a distance-of-mean test and a correlation analysis may be used.

As an embodiment, when sensing the side channel attack, the side channel attack sensing module 140 cuts off power supply of the secure device 100 by being transferred to a fuse. In other words, when sensing the side channel attack, power supply is cut off by performing fuse cutting. Hereby, the secure device 100 may be in an operation stop state or in a disabled state.

As another embodiment, when sensing the side channel attack, the side channel sensing module 140 is made to be in an operation stop or a disabled state of the secure device 100 by changing a position of an execution code value of the secure device 100. For example, changing of the position of the execution code value may be changing of an initial starting position when power is supplied.

As another embodiment, when sensing the side channel attack, the side channel attack sensing module 140 may induce the malfunction of the secure module 120 by providing different key of different plaintext to the secure module 120. At this time, a side channel attacker may acquire totally unrelated waveforms, and analyze the waveforms.

As another embodiment, when sensing the side channel attack, the side channel attack sensing module 140 may delay the operation of the secure module 120. Therefore, the data acquisition required for the side channel analysis may be restricted.

General secure devices may use a method of improving a security algorithm, shaking timing at which the security algorithm is performed, or masking to a master key for protecting the side channel attack. However, these secure devices may leak an encryption key used in an internal security algorithm because a lot of side channel information is acquired.

On the contrary, the secure device 100 of the present invention may sense the side channel attack, and, when sensing the side channel attack, the secure device 100 may stop the operation of the secure module 120, induce a malfunction of the secure module 120, delay the operation of the secure module 120, or make the secure module 120 or the device 100 having the secure module 120 disabled. Therefore, the secure device 100 of the present invention enables side channel attack not to be executed fundamentally. As a result, the secure device 100 of the present invention can safely protect an internal security algorithm and an encryption key thereof.

For the convenience of description, it is assumed below that a coding operation is performed repeatedly for a predetermined time during the side channel attack. On the contrary, it is assumed that the possibility of repeatedly performing the coding operation for a predetermined time is extremely small in general operation other than the side channel attack.

Figure 2:
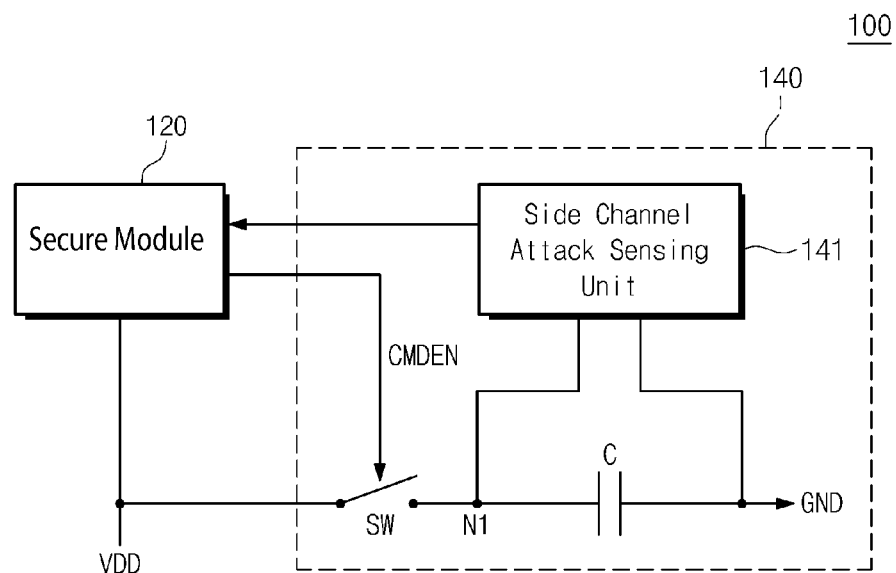
FIG. 2 is a diagram illustrating a first embodiment for a side channel attack sensing module shown in FIG. 1.

FIG. 2 is a diagram illustrating a first embodiment for the side channel attack sensing module 140 shown in FIG. 1. Referring to FIG. 2, the side channel attack sensing module 140 may include a switch SW, a capacitor C and a side channel attack sensing unit 141. The side channel attack sensing module 140 of the present invention may include the capacitor C allowing charges to be accumulated by executing a command of the secure module 120.

The switch SW may be connected between a power supply terminal VDD and a charging node N1, and perform a switching operation in response to a command execution enable signal CMDEN. Here, the command execution enable signal CMDEN may be output from the secure module 120 whenever the command is executed.

The capacitor C may be connected between the charging node N1 and a ground GND, and accumulate charges transferred from the power supply terminal VDD according to the operation of the switch SW. That is, the capacitor C may accumulate charges according to the execution number of commands. Here, the capacitance of the capacitor C may be large enough to recognize the side channel attack. That is, the capacitor C may have a capacitance enough to accumulate charges corresponding to the execution number of commands (for example, 20 times) allowing the side channel attack to be recognized.

The side channel attack sensing unit 141 may sense a voltage between both terminals of the capacitor C. The side channel attack sensing unit 141 may sense a voltage between the charging node N1 and the ground GND. When the sensed voltage exceeds a predetermined value, the side channel attack sensing unit 141 may determine that there is a side channel attack upon the secure device 100.

If determining the side channel attack, the side channel attack sensing unit 141 transmits a sensing result to the secure module 120. The secure module 120 may cut off power supply of the secure module 120 or change an execution code value according to the transmitted sensing result. Therefore, the secure module 120 may stop operating or may be disabled.

On the contrary, when determining that there is no side channel attack even after the lapse of a predetermined time, the side channel attack sensing unit 141 discharges the capacitor C by connecting the charging node N1 to the ground GND.

As an embodiment of the present invention, when the side channel attack sensing unit 141 determines that there is no side channel attack even after the lapse of a predetermined time, the capacitor C may be discharged naturally.

Figure 3:
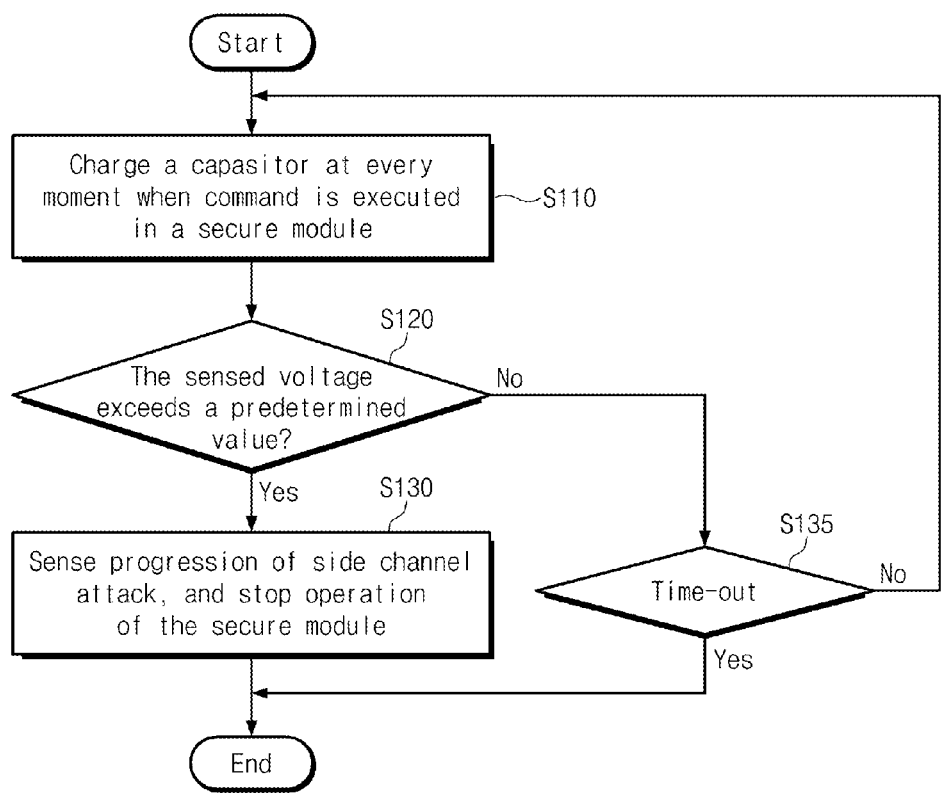
FIG. 3 is a flowchart illustrating a method for preventing a side channel attack of a side channel attack sensing module shown in FIG. 2.

FIG. 3 is a flowchart illustrating a method for preventing the side channel attack by the side channel attack sensing module shown in FIG. 2. Referring to FIGS. 2 and 3, the method for preventing the side channel attack may be performed as below.

During the operation of the secure module 100, the secure module 120 may generate the command execution enable signal CMDEN at every moment when the command is executed performed. The generated command execution enable signal CMDEN may be transmitted to the switch SW. Accordingly, charges may be accumulated on the capacitor C because the switch SW is switched in response to the command execution enable signal CMDEN.

The side channel attack sensing unit 141 may sense the voltage between both terminals of the capacitor C. In operation S120, when the sensed voltage exceeds a predetermined value, in other words, when the execution number of commands is greater than a predetermined number, the side channel attack sensing unit 141 may determine that there is a side channel attack. That is, when the execution number of commands is greater than the predetermined number during a predetermined time, the side channel attack sensing unit 141 may determine that there is the side channel attack.

In operation S130, when the voltage of the charged capacitor C exceeds the predetermined value, that is, when it is determined that there is the side channel attack, the operation of the secure module 120 is stopped or disabled.

In operation S135, when the voltage of the charged capacitor C does not exceeds the predetermined value, the side channel attack sensing unit 141 determines whether a predetermined time elapses. If the predetermine time elapses, the operation of protecting the side channel attack is completed by judging there is no side channel attack. On the contrary, when the predetermined time does not elapse, the procedure returns to the operation S110 again.

In the method of protecting for side channel attack according to the present invention described above, the side channel attack may be sensed by accumulating charges of the capacitor at every moment when the command is executed, and the secure module 120 may be stopped operating or disabled according to the sensing result.

Figure 4:
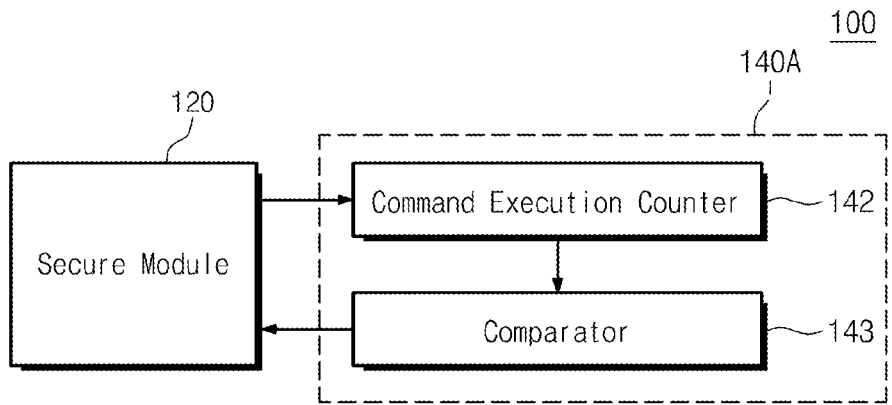
FIG. 4 is a diagram illustrating a second embodiment for a side channel attack sensing module shown in FIG. 1.

FIG. 4 is a diagram illustrating a second embodiment for the side channel attack sensing module shown in FIG. 1. Referring to FIG. 4, a side channel attack sensing module 140A may include a command execution counter 142 and a comparator 143. The side channel attack sensing module 140A of the present invention may sense the side channel attack according to whether the execution number of commands is greater than a predetermined number or not. It is assumed herein that the execution number of commands for acquiring the encryption key during the side channel attack is greater than the execution number of commands executed in general operations.

The command execution counter 142 may increase the execution number of commands whenever the commands are executed to the secure module 120. Although not shown, the increased execution number of commands may be stored in a nonvolatile memory device. The nonvolatile memory device may be a ROM, a PRAM, a NAND flash, a NOR flash, and so on.

In another embodiment, the command execution counter 142 may be realized to increase the execution number of commands only during a predetermined time. When the predetermined time elapses, the command execution counter 142 may be reset.

The comparator 143 may compare the increased execution number of commands with a predetermined value, and determine according to the comparing result whether there is a side channel attack. For example, when the execution number of commands is greater than the predetermined value, it is determined that there is a side channel attack. Although not shown in the drawings, the predetermined value may be stored in the nonvolatile memory device.

In the method of protecting the side channel attack according to the present invention, the side channel attack may be sensed by counting the execution number of command whenever the commands are executed, and the secure module 120 may be stopped operating or disabled according to the sensing result.

Figure 5:
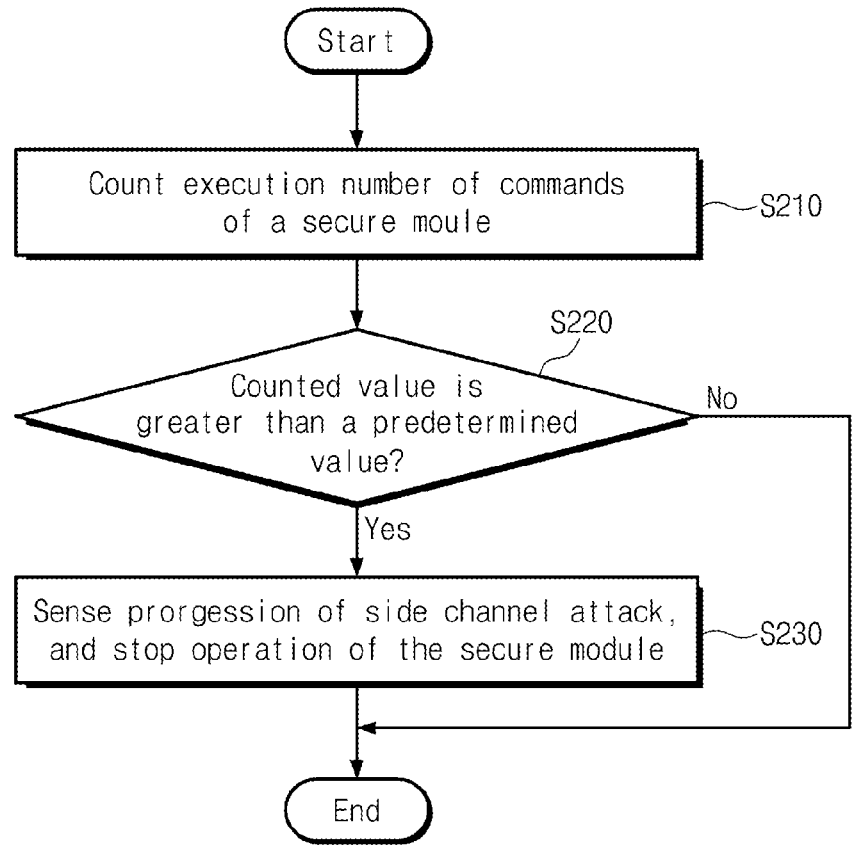
FIG. 5 is a flowchart illustrating an operation method of the side channel attack sensing module shown in FIG. 4.

FIG. 5 is a flowchart illustrating an operation method of the side channel attack sensing module 140A shown in FIG. 4. Referring to FIGS. 4 and 5, the method of protecting for side channel attack may be performed in following manner.

In operation S210, the command execution counter 142 may count the execution number of commands whenever the commands are executed in the secure module 100.

In operation S220, the comparator 143 may determine that the counted value counted is greater than a predetermined value. When the counted value is greater than the predetermined value, the comparator 143 may determine that there is a side channel attack.

In operation S230, when the counted value counted is greater than the predetermined value, that is, when it is determined that there is the side channel attack, the secure module 120 is stopped operating or disabled.

On the contrary, when the counted value is not greater than the predetermined value, the operation of protecting the side channel attack may be completed by determining that there is no side channel attack.

In the secure device 100 illustrated in FIGS. 1 to 5, the description has been given of the method of protecting for the side channel attack in regard to power analysis attack. However, the secure device 100 of the present invention is not limited to power analysis attack. The secure device 100 of the present invention is also applicable to timing attack, or fault insertion attack.

Here the fault insertion attack enables to find out an encryption key by applying an overvoltage, dropping a voltage, or making a secure module malfunction through strong laser light. To sense the fault insertion attack, the secure device 100 of the present invention may sense abnormal current or voltage, or include a side channel attack sensing module having a sensor for sensing laser light.

The secure device illustrated in FIGS. 1 to 5 may include the side channel attack sensing module. However, the secure module of the present invention may not include the side channel attack sensing module necessarily. The secure device of the present invention may include a secure module configured to limit the number of operations regardless of sensing of the side channel attack. For example, the secure module may be realized to have the limited number of the operation is 5000 times. The secure device may include a command execution counter to increase the execution number of command whenever the secure module operates. Here, when the execution number of commands exceeds the limit value (for example, 5000 times), the operation of the secure module is limited.

In the embodiment, the predetermined value may be set again through authentication procedure, after the operation of the secure module is limited.

Figure 6:
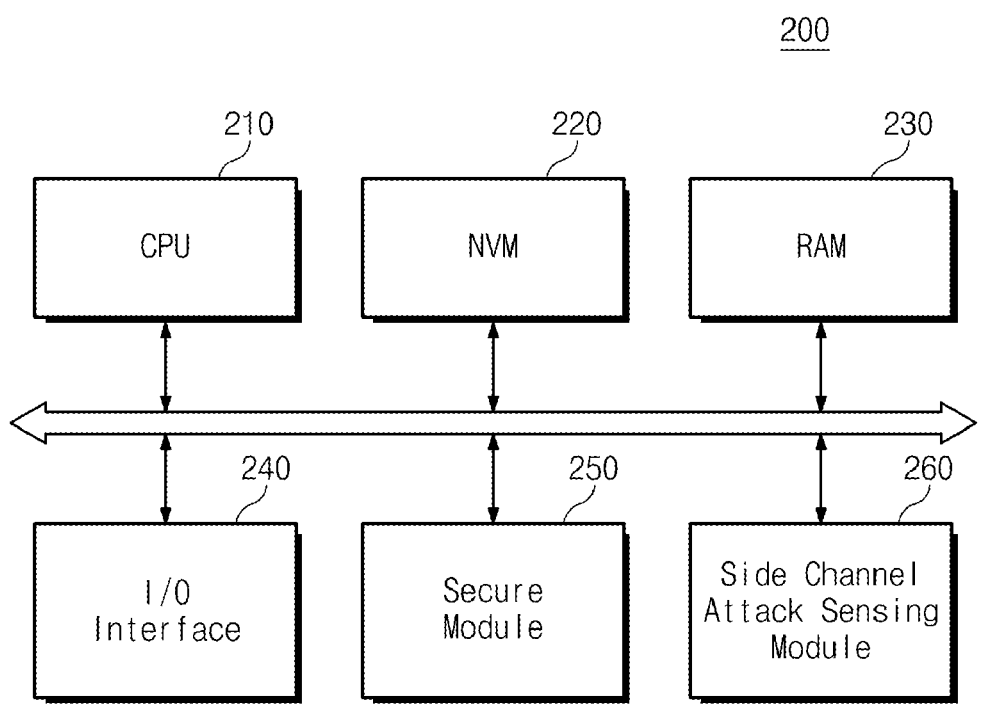
FIG. 6 is a block diagram illustrating an embodiment of a smart card including a side channel attack sensing module according to the prevent invention.

FIG. 6 is a block diagram illustrating an embodiment of a smart card including a side channel attack sensing module according to the prevent invention. Referring to FIG. 6, a smart card 200 according to the present invention may include a central processing unit (CPU) 210, a nonvolatile memory device 220, a RAM 230, an input/output (I/O) interface 240, a secure module 250, and a side channel attack sensing module 260.

The side channel attack sensing module 260 according to the present invention may be either the side channel attack sensing module shown 140 FIG. 2 or the side channel attack sensing module 140A FIG. 4.

The CPU 210 may control the overall operation of the smart card 200.

The nonvolatile memory device 220 may store an execution code of the smart card 200, data encoded, and information for side channel attack sensing.

The RAM 200 may store temporary data required for performing the operation of the smart card 200.

The I/O interface 240 may transmit/receive data, address, and command between the smart card 200 and the outside.

The secure module 250 may convert plaintext data transmitted from the I/O interface 240 to ciphertext data through an encoding algorithm, or decoding the stored ciphertext data to plaintext data to thereby output the plaintext data to the I/O interface 240.

The side channel attack sensing module 260 may determine from the execution number of commands during the operation of the secure module 250 that there is a side channel attack. For example, the side channel attack sensing module 260 may sense the side channel attack by accumulating charges on the capacitor according to the execution number of commands, or by counting the execution number of the command directly.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A secure device, comprising:
   a secure module configured to convert plaintext data received from an outside into ciphertext data and store the converted ciphertext data, and further configured to convert stored ciphertext data into plaintext data and output the converted plaintext data; and
   a side channel attack sensing module comprising:
   a switch coupled between a power supply terminal and a charging node, and operating in response to the command execution enable signal;
   a capacitor coupled between the charging node and a ground, and accumulating charges transferred from the power supply terminal according to an operation of the switch; and
   a side channel attack sensing unit sensing a voltage between the charging node and the ground and determining that there is a side channel attack when the sensed voltage exceeds a predetermined voltage value,
   wherein if the side channel attack sensing unit determines there is a side channel attack, the side channel attack sensing module causes the secure module to stop operating, induces malfunctions of the secure module, delays operations of the secure module, or causes the secure module or a device including the secure module to be disabled.

2. The secure device of claim 1, wherein the side channel attack sensing unit determines that there is no side channel attack when the sensed voltage does not exceed the predetermined voltage value after of a predetermined time lapses.

3. The secure device of claim 1, wherein the side channel attack sensing module further comprises a non-volatile memory storing the predetermined voltage value.

4. The secure device of claim 1, wherein the side channel attack sensing module causes the secure module to be disabled by changing an execution code of the secure module when the side channel attack is sensed.

5. The secure device of claim 1, wherein the side channel attack sensing module further comprises a sensor configured to sense abnormal current or voltage, or sense laser light.

6. A non-transitory computer readable media having stored thereon a program causing a computer to execute a method of protecting a secure device from a side channel attack, the method comprising:
   operating a switch in response to a command execution enable signal from a secure module;
   accumulating charges in a capacitor in a side channel attack sensing module, the charges being transferred from a power supply terminal according to an operation of the switch;
   sensing a voltage between a charging node and a ground;
   determining that there is a side channel attack when the sensed voltage exceeds a predetermined voltage value; and
   causing operations of a secure module to stop, inducing malfunctions of the secure module, delaying operations of the secure module, or causing the secure module or a device including the secure module to be disabled, when it is determined there is a side channel attack.

7. The non-transitory computer readable media of claim 6, wherein the program causes the computer to further execute the step of
   determining that there is no side channel attack when the sensed voltage does not exceed the predetermined voltage value.

8. The non-transitory computer readable media of claim 6, wherein the causing the secure module to be disabled comprises changing an execution code of the secure module when it is determined that there is a side channel attack.

9. The non-transitory computer readable media of claim 7, wherein the switch is coupled between a power supply terminal and a charging node.

10. The non-transitory computer readable media of claim 7, wherein the capacitor is coupled between the charging node and a ground.

\* \* \* \* \*